United States Patent
Fan

(10) Patent No.: US 12,096,297 B2
(45) Date of Patent: Sep. 17, 2024

(54) CELL SELECTION METHOD, NETWORK DEVICE AND TERMINAL

(71) Applicant: DATANG MOBILE COMMUNICATIONS EQUIPMENT CO., LTD., Beijing (CN)

(72) Inventor: Jiangsheng Fan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 401 days.

(21) Appl. No.: 17/607,013

(22) PCT Filed: Apr. 7, 2020

(86) PCT No.: PCT/CN2020/083450
§ 371 (c)(1),
(2) Date: Oct. 27, 2021

(87) PCT Pub. No.: WO2020/220940
PCT Pub. Date: Nov. 5, 2020

(65) Prior Publication Data
US 2022/0210711 A1    Jun. 30, 2022

(30) Foreign Application Priority Data

Apr. 28, 2019    (CN) .................... 201910350562.1

(51) Int. Cl.
*H04W 48/16*    (2009.01)
*H04W 36/08*    (2009.01)
*H04W 36/32*    (2009.01)

(52) U.S. Cl.
CPC .......... *H04W 36/08* (2013.01); *H04W 36/32* (2013.01); *H04W 48/16* (2013.01)

(58) Field of Classification Search
CPC ..... H04W 36/08; H04W 36/32; H04W 48/16; H04W 48/18; H04W 84/06; H04W 36/0061; H04W 36/0085; H04W 36/30
See application file for complete search history.

(56) References Cited

U.S. PATENT DOCUMENTS 6,072,768 A * 6/2000 Wiedeman ......... H04B 7/18563
370/320
6,512,920 B1 * 1/2003 Yaoya ................ H04B 7/18541
455/427
(Continued)

FOREIGN PATENT DOCUMENTS

CN    101808380 A    8/2010
CN    104185233 A    12/2014
(Continued)

OTHER PUBLICATIONS

3GPP Tsg-Ran WG3 #101, R3-185957 dated Oct. 8, 10/12, 2018 (Year: 2018).*
(Continued)

*Primary Examiner* — Lan-Huong Truong
(74) *Attorney, Agent, or Firm* — Ladas & Parry, LLP

(57) ABSTRACT

The present disclosure provides a cell selection method, a network device and a terminal. The method includes triggering a terminal in an idle state or in an inactive state to move between a satellite cell and a terrestrial cell when a first preset condition is met.

18 Claims, 5 Drawing Sheets

(56) References Cited

U.S. PATENT DOCUMENTS

| | | | |
|---|---|---|---|
| 11,516,715 B2* | 11/2022 | Matsuda | H04W 36/0072 |
| 2004/0229616 A1 | 11/2004 | Dutta et al. | |
| 2011/0143752 A1 | 6/2011 | Hong | |
| 2013/0189975 A1 | 7/2013 | Wyler | |
| 2014/0003261 A1 | 1/2014 | Gillett et al. | |
| 2016/0234828 A1 | 8/2016 | Smith et al. | |
| 2016/0323800 A1 | 11/2016 | Ulupinar et al. | |
| 2017/0230104 A1* | 8/2017 | Purkayastha | H04B 7/18541 |
| 2019/0245614 A1 | 8/2019 | Lucky et al. | |
| 2020/0178137 A1* | 6/2020 | Hassan Hussein | H04B 7/18541 |

FOREIGN PATENT DOCUMENTS

| | | | |
|---|---|---|---|
| CN | 104412662 A | 3/2015 |
| CN | 108112281 A | 6/2018 |
| CN | 109690973 A | 4/2019 |

OTHER PUBLICATIONS

International Search Report for PCT Application PCT/CN2020/083450, issued Jul. 9, 2020 and its English Translation.
Written Opinion for PCT Application PCT/CN2020/083450, issued Jul. 9, 2020 and its English Translation.
First Office Action and search report for Chinese Patent Application 201910350562.1, issued Feb. 24, 2021 and its English Translation.
First Office Action and search report for Taiwanese Patent Application 109113486, issued May 12, 2021 and its English Translation.

* cited by examiner

CELL SELECTION METHOD, NETWORK DEVICE AND TERMINAL

CROSS-REFERENCE TO RELATED APPLICATIONS

This application is the U.S. national phase of PCT Application No. PCT/CN2020/083450 filed on Apr. 7, 2020, which claims priority to the Chinese patent application No. 201910350562.1 filed on Apr. 28, 2019, the disclosures of which are incorporated herein by reference in their entireties.

TECHNICAL FIELD

The present disclosure relates to the field of communications technology, in particular to a cell selection method, a network device and a terminal.

BACKGROUND

The satellite communication system is a new communication system. Compared with the terrestrial cellular communication system, the satellite communication system has the characteristics of large coverage and high delay, and the cellular communication system has the advantages of large capacity and low delay, especially in a densely populated urban area, the advantages of terrestrial cellular communication systems are still incomparable with satellite communications, so it is of practical significance to consider the issue of mutual mobility between the satellite communication system and the terrestrial cellular communication system.

The related technology can only solve the mobility problem in the terrestrial cellular system, but there is no protocol to describe the mobility problem between the satellite system and the terrestrial system. This is because a terrestrial cell is too small compared to a satellite cell. The moving speed of a low-orbit satellite can reach several kilometers per second. In other words, the satellite beam may have swept over a dozen terrestrial cells in one second. When the location of the terminal is unknown, it is difficult for the network side to accurately redirect the terminal to a terrestrial cell; even if there is valid terminal location information on the network side, it is unlikely that the network side will store a large amount of base station distribution information to redirect the terminal to the terrestrial cell, therefore, the mobility management solution of the terrestrial system cannot work well in the mobility management between the satellite system and the terrestrial system.

SUMMARY

An object of the present disclosure is to provide a cell selection method, a network device and a terminal, thereby solving the problem of mobility of the terminal between the satellite communication system and the terrestrial communication system.

A cell selection method applied to a network device, includes: triggering a terminal in an idle state or in an inactive state to move between a satellite cell and a terrestrial cell when a first preset condition is met, wherein the first preset condition includes: a distance between a geographic coordinate corresponding to a center beam of a satellite and at least one preset geographic coordinate is less than the first preset threshold.

In some embodiments of the present disclosure, the triggering a terminal in an idle state or in an inactive state to move between a satellite cell and a terrestrial cell includes: triggering the terminal in the idle state or inactive state and residing in the satellite cell to search for the terrestrial cell; controlling the terminal to move from the satellite cell to the searched terrestrial cell and completing a cell residing process when the searched terrestrial cell meets a cell selection criterion.

In some embodiments of the present disclosure, the triggering a terminal in an idle state or in an inactive state to move between a satellite cell and a terrestrial cell includes: triggering the terminal in the idle state or the inactive state and residing in the terrestrial cell to search for the satellite cell; controlling the terminal to move from the terrestrial cell to the searched satellite cell and complete a cell residing process when the searched satellite cell meets a cell selection criterion.

In some embodiments of the present disclosure, the triggering a terminal in an idle state or in an inactive state to move between a satellite cell and a terrestrial cell includes: triggering the terminal in the idle state or the inactive state to move between the satellite cell and the terrestrial cell by sending cell selection indication information to the terminal, wherein the cell selection indication information is used to instruct the terminal to search for a cell in a terrestrial frequency band or a cell in a satellite frequency band.

In some embodiments of the present disclosure, the cell selection indication information is sent to the terminal through a connection rejection message, a connection release message, or a paging short message.

Some embodiments of the present disclosure provides a cell selection method applied to a terminal, includes: moving between a satellite cell and a terrestrial cell by the terminal in an idle state or in an inactive state when a second preset condition is met.

In some embodiments of the present disclosure, the moving between a satellite cell and a terrestrial cell includes: searching for the terrestrial cell by the terminal in the idle state or in the inactive state and residing in the satellite cell; moving from the satellite cell to the searched terrestrial cell and completing a cell residing process when the searched terrestrial cell meets a cell selection criterion.

In some embodiments of the present disclosure, the moving between a satellite cell and a terrestrial cell includes: searching for the satellite cell by the terminal in the idle state or in the inactive state and residing in the terrestrial cell; moving from the terrestrial cell to the searched satellite cell and completing a cell residing process when the searched satellite cell meets a cell selection criteria.

In some embodiments of the present disclosure, the second preset condition includes at least one of the following: a distance between a current geographic location coordinate of the terminal and at least one preset geographic coordinate is less than a second preset distance threshold; receiving cell selection indication information sent by a network device, wherein the cell selection indication information is used to instruct the terminal to search for a cell in a terrestrial frequency band or a cell in a satellite frequency band; or the terminal does not find a satellite frequency band signal or a terrestrial frequency band signal.

In some embodiments of the present disclosure, the cell selection indication information is received through a connection rejection message, a connection release message, or a paging short message.

In some embodiments of the present disclosure, after moving between a satellite cell and a terrestrial cell by the terminal in an idle state or in an inactive state, the method further includes: returning to the idle state.

In some embodiments of the present disclosure, the moving between a satellite cell and a terrestrial cell by the terminal in an idle state or in an inactive state includes: moving from the terrestrial cell to the satellite cell by the terminal in the idle state or the inactive state when a third preset condition is met; wherein, the third preset condition is: the terminal is in any cell selection state, and after the terminal has not found the terrestrial cell according to a stored information search mode and a scan search mode in turn, the terminal finds the satellite cell according to the stored information search mode; or the third preset condition is: the terminal is in any cell selection state, and the terminal has not found the terrestrial cell according to the stored information search mode and the scan search mode in turn, and after the terminal has not found the satellite cell according to the stored information search mode, the terminal finds the satellite cell according to the scan search mode; or the third preset condition is: the terminal is in any cell selection state, the terminal has not found the terrestrial cell according to the stored information search mode and the scan search mode in turn, and has not found the satellite cell according to the stored information search mode and the scan search mode, it is detected that there is no acceptable cell for residing in a terrestrial communication system, and there is an acceptable cell for residing in a satellite communication system.

In some embodiments of the present disclosure, the moving between a satellite cell and a terrestrial cell by the terminal in an idle state or in an inactive state includes: moving from the satellite cell to the terrestrial cell by the terminal in the idle state or the inactive state when a fourth preset condition is met; wherein, the fourth preset condition is: the terminal is in any cell selection state, and finds the terrestrial cell according to a stored information search mode; or the fourth preset condition is: the terminal is in any cell selection state, and after the terminal has not found the terrestrial cell according to the stored information search mode, the terminal finds the terrestrial cell according to a scan search mode; or the fourth preset condition is: the terminal is in any cell selection state, the terminal has not found the terrestrial cell according to the stored information search mode and the scan search mode in turn, and has not found the satellite cell according to the stored information search mode and the scan search mode in turn, it is detected that there is an acceptable cell for residing in a terrestrial communication system.

In some embodiments of the present disclosure, the moving between a satellite cell and a terrestrial cell by the terminal in an idle state or in an inactive state includes: moving from the satellite cell to the terrestrial cell by the terminal in the idle state or in the inactive state when a fifth preset condition is met; wherein, the fifth preset condition is: the terminal resides on an acceptable cell in a satellite communication system, and the terminal finds the terrestrial cell according to a stored information search mode; or the fifth preset condition is: the terminal resides on the acceptable cell in the satellite communication system, and after the terminal has not found the terrestrial cell according to the stored information search mode, the terminal finds the terrestrial cell according a the scan search mode; or the fifth preset condition is: the terminal resides on the acceptable cell in the satellite communication system, the terminal has not found the terrestrial cell according to the stored information search mode and the scan search mode in turn, and has not found the satellite cell according to the stored information search mode and the scan search mode in turn, it is detected that there is an acceptable cell to reside on in a terrestrial communication system.

In some embodiments of the present disclosure, the moving between a satellite cell and a terrestrial cell by the terminal in an idle state or in an inactive state includes: moving from the terrestrial cell to the satellite cell by the terminal in the idle state or in the inactive state when a sixth preset condition is met; wherein, the sixth preset condition is: the terminal resides on an acceptable cell in a terrestrial communication system, and the terminal finds the satellite cell according to a stored information search mode; or the sixth preset condition is: the terminal resides on the acceptable cell in the terrestrial communication system, and after the terminal has not found the satellite cell according to the stored information search mode, the terminal finds the satellite cell according to a scan search mode; or the sixth preset condition is: the terminal resides on the acceptable cell in the terrestrial communication system, the terminal has not found the terrestrial cell according to the stored information search mode and the scan search mode in turn, and has not found the satellite cell according to the stored information search mode and the scan search mode in turn, it is detected that there is an acceptable cell to reside on in a satellite communication system.

Some embodiment of the present disclosure provides a network device, includes: a transceiver, a memory, a processor and a program stored on the memory and executed by the processor, the processor executes the program to implement the step of: triggering a terminal in an idle state or in an inactive state to move between a satellite cell and a terrestrial cell when a first preset condition is met, wherein the first preset condition includes: a distance between a geographic coordinate corresponding to a center beam of a satellite and at least one preset geographic coordinate is less than the first preset threshold.

In some embodiments of the present disclosure, the processor implements the step of triggering a terminal in an idle state or in an inactive state to move between a satellite cell and a terrestrial cell includes: triggering the terminal in the idle state or inactive state and residing in the satellite cell to search for the terrestrial cell; controlling the terminal to move from the satellite cell to the searched terrestrial cell and completing a cell residing process when the searched terrestrial cell meets a cell selection criterion.

In some embodiments of the present disclosure, the processor implements the step of triggering a terminal in an idle state or in an inactive state to move between a satellite cell and a terrestrial cell includes: triggering the terminal in the idle state or the inactive state and residing in the terrestrial cell to search for the satellite cell; controlling the terminal to move from the terrestrial cell to the searched satellite cell and complete a cell residing process when the searched satellite cell meets a cell selection criterion.

In some embodiments of the present disclosure, the processor implements the step of triggering a terminal in an idle state or in an inactive state to move between a satellite cell and a terrestrial cell includes: triggering the terminal in the idle state or the inactive state to move between the satellite cell and the terrestrial cell by sending cell selection indication information to the terminal, wherein the cell selection indication information is used to instruct the terminal to search for a cell in a terrestrial frequency band or a cell in a satellite frequency band.

In some embodiments of the present disclosure, the cell selection indication information is sent to the terminal through a connection rejection message, a connection release message, or a paging short message.

Some embodiments of the present disclosure provides a computer readable storage medium, on which a computer program is stored on, the computer program is executed by a processor to implement the steps of the cell selection method.

Some embodiments of the present disclosure provides terminal including a transceiver, a memory, a processor and a program stored on the memory and executed by the processor, the process executes the program to implement the step of: moving between a satellite cell and a terrestrial cell by the terminal in an idle state or in an inactive state when a second preset condition is met.

In some embodiments of the present disclosure, the processor implements the step of moving between a satellite cell and a terrestrial cell includes: searching for the terrestrial cell by the terminal in the idle state or in the inactive state and residing in the satellite cell; moving from the satellite cell to the searched terrestrial cell and completing a cell residing process when the searched terrestrial cell meets a cell selection criterion.

In some embodiments of the present disclosure, the processor implements the step of moving between a satellite cell and a terrestrial cell includes: searching for the satellite cell by the terminal in the idle state or in the inactive state and residing in the terrestrial cell; moving from the terrestrial cell to the searched satellite cell and completing a cell residing process when the searched satellite cell meets a cell selection criteria.

In some embodiments of the present disclosure, the second preset condition includes at least one of the following: a distance between a current geographic location coordinate of the terminal and at least one preset geographic coordinate is less than a second preset distance threshold; receiving cell selection indication information sent by a network device, wherein the cell selection indication information is used to instruct the terminal to search for a cell in a terrestrial frequency band or a cell in a satellite frequency band; or the terminal does not find a satellite frequency band signal or a terrestrial frequency band signal.

In some embodiments of the present disclosure, the cell selection indication information is received through a connection rejection message, a connection release message, or a paging short message.

In some embodiments of the present disclosure, after the processor implements the step of moving between a satellite cell and a terrestrial cell by the terminal in an idle state or in an inactive state, the processor further implements the step of: returning to the idle state.

In some embodiments of the present disclosure, the processor implements the step of the moving between a satellite cell and a terrestrial cell by the terminal in an idle state or in an inactive state includes: moving from the terrestrial cell to the satellite cell by the terminal in the idle state or the inactive state when a third preset condition is met; wherein, the third preset condition is: the terminal is in any cell selection state, and after the terminal has not found the terrestrial cell according to a stored information search mode and a scan search mode in turn, the terminal finds the satellite cell according to the stored information search mode; or the third preset condition is: the terminal is in any cell selection state, and the terminal has not found the terrestrial cell according to the stored information search mode and the scan search mode in turn, and after the terminal has not found the satellite cell according to the stored information search mode, the terminal finds the satellite cell according to the scan search mode; or the third preset condition is: the terminal is in any cell selection state, the terminal has not found the terrestrial cell according to the stored information search mode and the scan search mode in turn, and has not found the satellite cell according to the stored information search mode and the scan search mode, it is detected that there is no acceptable cell for residing in a terrestrial communication system, and there is an acceptable cell for residing in a satellite communication system.

In some embodiments of the present disclosure, the processor implements the step of moving between a satellite cell and a terrestrial cell by the terminal in an idle state or in an inactive state includes: moving from the satellite cell to the terrestrial cell by the terminal in the idle state or the inactive state when a fourth preset condition is met; wherein, the fourth preset condition is: the terminal is in any cell selection state, and finds the terrestrial cell according to a stored information search mode; or the fourth preset condition is: the terminal is in any cell selection state, and after the terminal has not found the terrestrial cell according to the stored information search mode, the terminal finds the terrestrial cell according to a scan search mode; or the fourth preset condition is: the terminal is in any cell selection state, the terminal has not found the terrestrial cell according to the stored information search mode and the scan search mode in turn, and has not found the satellite cell according to the stored information search mode and the scan search mode in turn, it is detected that there is an acceptable cell for residing in a terrestrial communication system.

In some embodiments of the present disclosure, the processor implements the step of the moving between a satellite cell and a terrestrial cell by the terminal in an idle state or in an inactive state includes: moving from the satellite cell to the terrestrial cell by the terminal in the idle state or in the inactive state when a fifth preset condition is met; wherein, the fifth preset condition is: the terminal resides on an acceptable cell in a satellite communication system, and the terminal finds the terrestrial cell according to a stored information search mode; or the fifth preset condition is: the terminal resides on the acceptable cell in the satellite communication system, and after the terminal has not found the terrestrial cell according to the stored information search mode, the terminal finds the terrestrial cell according a the scan search mode; or the fifth preset condition is: the terminal resides on the acceptable cell in the satellite communication system, the terminal has not found the terrestrial cell according to the stored information search mode and the scan search mode in turn, and has not found the satellite cell according to the stored information search mode and the scan search mode in turn, it is detected that there is an acceptable cell to reside on in a terrestrial communication system.

In some embodiments of the present disclosure, the processor implements the step of the moving between a satellite cell and a terrestrial cell by the terminal in an idle state or in an inactive state includes: moving from the terrestrial cell to the satellite cell by the terminal in the idle state or in the inactive state when a sixth preset condition is met; wherein, the sixth preset condition is: the terminal resides on an acceptable cell in a terrestrial communication system, and the terminal finds the satellite cell according to a stored information search mode; or the sixth preset condition is: the terminal resides on the acceptable cell in the terrestrial communication system, and after the terminal has not found the satellite cell according to the stored information search mode, the terminal finds the satellite cell according to a scan search mode; or the sixth preset condition is: the terminal resides on the acceptable cell in the terrestrial communication system, the terminal has not found the terrestrial cell according to the stored information search mode and the scan search mode in turn, and has not found the satellite cell according to the stored information search mode and the scan search mode in turn, it is detected that there is an acceptable cell to reside on in a satellite communication system.

Some embodiments of the present disclosure provides a computer readable storage medium, on which a computer program is stored on, the computer program is executed by a processor to implement the steps of the cell selection method.

Some embodiments of the present disclosure provides a network device, includes: a trigger module, configured to trigger a terminal in an idle state or in an inactive state to move between a satellite cell and a terrestrial cell when a first preset condition is met, wherein the first preset condition includes: a distance between a geographic coordinate corresponding to a center beam of a satellite and at least one preset geographic coordinate is less than the first preset threshold.

In some embodiments of the present disclosure, the trigger module is configured to trigger the terminal in the idle state or the inactive state to move between the satellite cell and the terrestrial cell by sending cell selection indication information to the terminal, wherein the cell selection indication information is used to instruct the terminal to search for a cell in a terrestrial frequency band or a cell in a satellite frequency band.

Some embodiments of the present disclosure provides a terminal, includes: a moving module, configured to enable the terminal in an idle state or in an inactive state to move between a satellite cell and a terrestrial cell when a second preset condition is met.

In some embodiments of the present disclosure, the second preset condition includes at least one of the following: a distance between a current geographic location coordinate of the terminal and at least one preset geographic coordinate is less than a second preset distance threshold; receiving cell selection indication information sent by a network device, wherein the cell selection indication information is used to instruct the terminal to search for a cell in a terrestrial frequency band or a cell in a satellite frequency band; or the terminal does not find a satellite frequency band signal or a terrestrial frequency band signal.

In some embodiments of the present disclosure, the terminal further includes a processing module, configured to, after the moving module enables the terminal in the idle state or in the inactive state to move between the satellite cell and the terrestrial cell, control the terminal to return to the idle state.

DETAILED DESCRIPTION

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

The terms "first" and "second" in the specification and claims of the present disclosure are used to distinguish similar objects, and not necessarily used to describe a specific sequence or order. It should be understood that the data used in this way can be interchanged under appropriate circumstances, so that the embodiments of the present disclosure can be implemented in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed. Those steps or units may include other steps or units that are not clearly listed or are inherent to these processes, methods, products, or devices. In the specification and claims, "and/or" means at least one of the connected objects.

The following description is for illustration and does not limit the scope, applicability, or configuration set forth in the claims. Modification can be made to the function and arrangement of the discussed elements without departing from the spirit and scope of the present disclosure. In various examples, various procedures or components may be omitted, substituted, or added as appropriate. For example, the described method can be performed in an order different from that described, and various steps can be added, omitted, or combined. In addition, features described with reference to certain examples may be combined in other examples.

Figure 1:
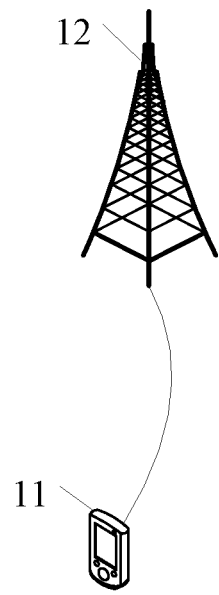
FIG. 1 is a structure diagram of a network system according to one embodiment of the present disclosure.

FIG. 1 shows a block diagram of a wireless communication system to which an embodiment of the present disclosure can be applied. The wireless communication system includes a terminal 11 and a network device 12. Among them, the terminal 11 may also be referred to as a terminal device or a User Equipment (UE), and the terminal 11 may be a mobile phone, a tablet personal computer, a laptop computer, or a personal digital assistant (PDA), a mobile Internet device (MID), a wearable device or a vehicle-mounted device and other devices in the terminal side. It should be noted that the specific type of terminal 11 is not limited in the embodiments of the present disclosure. The network device 12 may be a base station or a core network, where the above-mentioned base station may be a base station of the fifth generation wireless technology (5G) and later versions (for example: a 5G base station (next generation node base station (gNB), 5G New Radio (NR) base station, etc.), or base stations in other communication systems (for example: evolved node base station (eNB), a wireless local area network (WLAN) access point, or other access point, etc.), where the base station can be called Node B, Evolved Node B, Access Point, Base Transceiver Station (BTS), Radio Base Station, Radio Transceiver, Basic Service Set (BSS), Extended Service Set (ESS), Node B, Evolved Node B (eNB), Home Node B, Home Evolved Node B, WLAN Access Point, Wireless Fidelity (WiFi) node or some other appropriate term in the field, as long as the same technical effect is achieved, the base station is not limited to a specific technical vocabulary. It should be noted that in the embodiments of the present disclosure, only the base station in the NR system is used as an example, but the specific type of base station is not limited.

In order to enable those skilled in the art to better understand the technical solutions of the embodiments of the present disclosure, the following description is first made.

1. Description of the mobility process of a terminal in the idle state or inactive state in the NR terrestrial communication system.

(1) Cell Selection.

When the terminal does not reside on any cell, the cell selection process will be triggered. At this time, when the terminal determine by measurement that a certain cell meets the conditions of a suitable cell, the terminal selects to reside on that cell. The conditions of the suitable cell are as follows:

The public land mobile network (PLMN) of the selected cell belongs to one of the PLMN registered by the terminal, the PLMN that the terminal has selected, or the equivalent PLMN (EPLMN) stored by the terminal and the tracking area code corresponding to the PLMN supported by the cell exists;

The cell selection criterion S is satisfied;

The cell is not prohibited;

The tracking area code corresponding to the PLMN supported by the cell does not belong to any one in the list of tracking area codes for which the terminal is prohibited from residing.

(2) Cell Reselection.

The cell reselection process is briefly divided into two parts: cell reselection measurement initialization and cell reselection decision:

The introduction of the rule of the cell reselection measurement initialization is as follows:

For a frequency point with a high priority, the terminal always performs neighbor cell measurement for the frequency point with a high priority;

For a frequency point with a same or low priority, when the signal quality of the serving cell is less than a certain threshold, the terminal initializes the neighbor cell signal measurement process. Of course, thresholds for neighbor cell measurement initialization at the same frequency and different frequencies are different.

The brief introduction of the cell reselection decision rule is as follows:

For a frequency point cell with a high priority, as long as the measurement signal meets a certain preset threshold and can be maintained for a certain period of time, the terminal immediately reselects the cell;

For a frequency point cell with a same priority, the R criterion is used to rank all the measured target cells, and the cell with the highest ranking and capable of maintaining a certain period of time is used as a reselection cell of the final cell of the terminal;

For a frequency point cell with a low priority, when the quality of the serving cell is less than a certain threshold and the signal quality of the target cell is greater than a certain preset threshold and can be maintained for a certain period of time, the terminal reselects the target cell.

(3) Connection Rejection Process.

When the network side determines that it cannot accept the connection establishment request or the connection recovery request initiated by the terminal according to its own load and other information, the connection rejection message can be used to notify the terminal that the request is not allowed to be initiated again within a certain period of time.

(4) Connection Release Message.

The network side can use the connection release message to release a in a connected state to an idle or inactive state, or use the connection release message to release the terminal in the inactive state to the idle or inactive state. The connection release message also includes a redirection message, used to release the terminal to a specific system frequency point.

2. NR Paging Content Setting Principles.

Paging content setting includes two aspects: paging control channel content setting and paging message content setting.

The paging control channel content setting includes three parts. The first part includes two-bit indication information, which is used to indicate the presence or absence of the remaining two parts. The specific rules are shown in Table 1.

TABLE 1

| Bit value | Meaning |
| --- | --- |
| 00 | reserved |
| 01 | paging scheduling information only |
| 10 | paging short message only |
| 11 | paging scheduling information and paging short messages |

The second part includes paging scheduling information, which is used to indicate the resource location where the paging message is located; the third part includes a paging short message, which occupies 8 bits of resources, one bit is used to indicate system information update, and another bit is used to indicate alarm information update, and the remaining 6 bits are temporarily reserved.

The paging message content setting includes two parts. The first part is the paging record, which is used to fill in terminal identification list information that needs to be paged at the paging moment; the second part is the one-bit access type indication information, which is used to indicate whether the current paging message comes from a non-third generation partnership project (3GPP) system.

The mobility management solution of the terrestrial system in the related art cannot work well in the mobility management between the satellite system and the terrestrial system.

Figure 2:
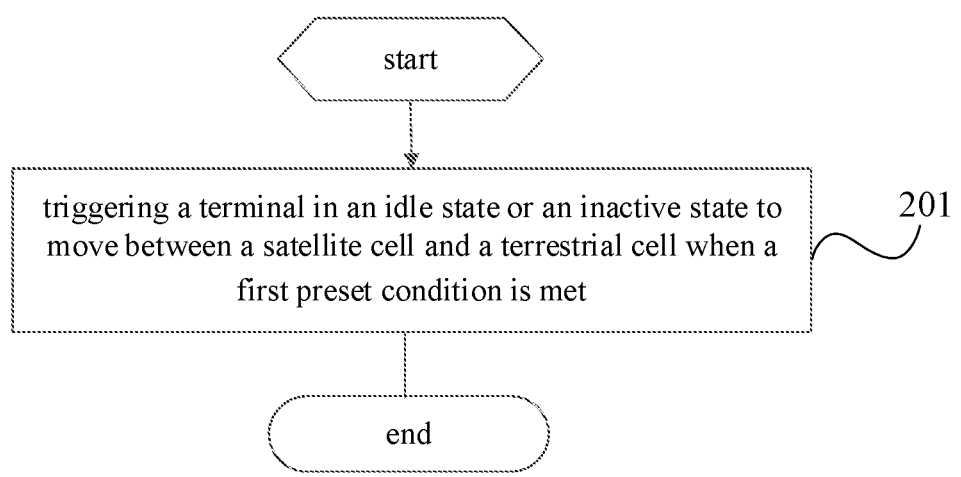
FIG. 2 is a flow chart of a cell selection method according to one embodiment of the present disclosure.

Based on this, as shown in FIG. 2, an embodiment of the present disclosure provides a cell selection method, which is applied to a network device, and includes:

Step 201: triggering a terminal in an idle state or an inactive state to move between a satellite cell and a terrestrial cell when a first preset condition is met.

When the first preset condition is met, the terminal in the idle state or the inactive state is triggered to move from the satellite cell to the terrestrial cell, or from the terrestrial cell to the satellite cell.

The first preset condition may specifically be that the distance between the geographic coordinate corresponding to the center beam of the satellite and the at least one preset geographic coordinate is less than the first preset threshold.

In the embodiment of the present disclosure, the network device determines that the distance between the geographic coordinates corresponding to the central beam of the satellite at the current moment and the at least one standard geographic coordinate is less than the first preset threshold based on Ephemeris Information and at least one standard geographic coordinate (preset geographic coordinate) stored by the network device, the terminal in the idle state or the inactive state is triggered to move between the satellite cell and the terrestrial cell.

Among them, the ephemeris information refers to the orbital operation data information and satellite identification related information of all satellites in the effective service area. By combining the ephemeris information and time information, the geographic coordinate information corresponding to the center beam of the satellite at the current time can be obtained; the above-mentioned first preset threshold and at least one standard geographic coordinate information are pre-configured on the network side.

In the cell selection method of the embodiment of the present disclosure, when the first preset condition is met, the terminal in the idle state or in the inactive state is triggered to move between the satellite cell and the terrestrial cell, thereby solving the problem of mobility of the terminal between the satellite communication system and the terrestrial communication system.

Further, triggering a terminal in an idle state or an inactive state to move between a satellite cell and a terrestrial cell includes:

triggering the terminal in the idle state or inactive state and residing in the satellite cell to search for a terrestrial cell;

when the searched terrestrial cell meets a cell selection criterion, controlling the terminal to move from the satellite cell to the searched terrestrial cell and completing the cell residing process.

Further, triggering a terminal in an idle state or an inactive state to move between a satellite cell and a terrestrial cell includes:

triggering the terminal in an idle state or an inactive state and residing in a terrestrial cell to search for a satellite cell;

when the searched satellite cell meets the cell selection criterion, controlling the terminal to move from the terrestrial cell to the searched satellite cell and complete the cell residing process.

Further, triggering a terminal in an idle state or an inactive state to move between a satellite cell and a terrestrial cell includes:

triggering the terminal in the idle state or the inactive state to move between the satellite cell and the terrestrial cell by sending cell selection indication information to the terminal, the cell selection indication information is used to instruct the terminal to search for a cell in terrestrial frequency band or a cell in satellite frequency band.

Wherein, the cell selection indication information is sent to the terminal through a connection rejection message, a connection release message, or a paging short message.

In the cell selection method of the embodiment of the present disclosure, when the first preset condition is met, the terminal in the idle state or in the inactive state is triggered to move between the satellite cell and the terrestrial cell, thereby solving the problem of mobility of the terminal between the satellite communication system and the terrestrial communication system.

Figure 3:
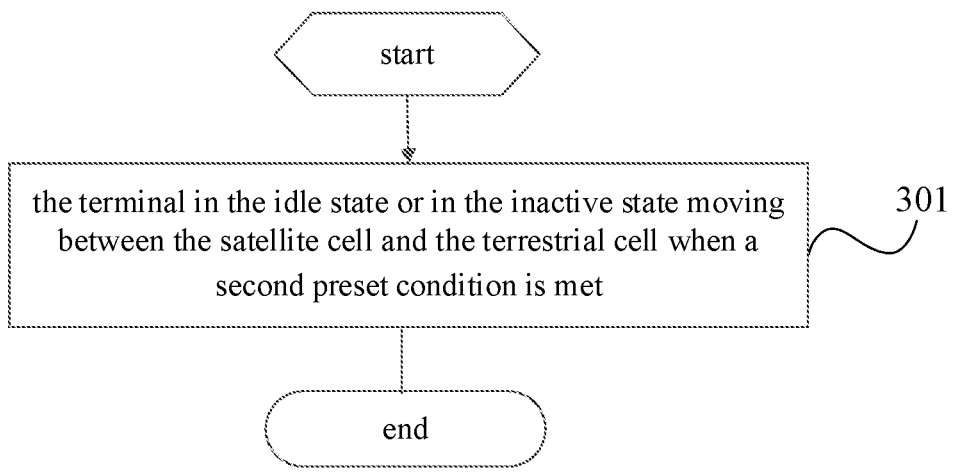
FIG. 3 is another flow chart of a cell selection method according to one embodiment of the present disclosure.

As shown in FIG. 3, an embodiment of the present disclosure also provides a cell selection method, which is applied to a terminal, and includes:

Step 301: the terminal in the idle state or in the inactive state moving between the satellite cell and the terrestrial cell when a second preset condition is met.

When the second preset condition is met, the terminal in the idle state or in the inactive state moves from the satellite cell to the terrestrial cell, or from the terrestrial cell to the satellite cell.

The second preset condition includes at least one of the following:

a distance between the current geographic location coordinates of the terminal and the at least one preset geographic coordinate is less than a second preset distance threshold;

receiving cell selection indication information sent by a network device, where the cell selection indication information is used to instruct the terminal to search for a cell in terrestrial frequency band cell or a cell in satellite frequency band;

the terminal cannot find a satellite frequency band signal or a terrestrial frequency band signal.

In the specific embodiment of the present disclosure, the terminal determines that the distance between the current geographic coordinates of the terminal and at least one standard geographic coordinate is less than the second preset threshold value based on the current geographic location coordinates of the terminal and standard geographic coordinate information stored by the terminal.

Wherein, the current geographic location information of the terminal is obtained by the positioning of the terminal, the aforementioned standard geographic coordinate information is pre-configured, and the second preset threshold may be indicated to the terminal by the network device through system information broadcasting or pre-configuration.

In the cell selection method of the embodiment of the present disclosure, when the second preset condition is met, the terminal in the idle state or in the inactive state moves between the satellite cell and the terrestrial cell, thereby solving the problem of mobility of the terminal between the satellite communication system and the terrestrial communication system.

Further, moving between the satellite cell and the terrestrial cell includes:

searches for a terrestrial cell by the terminal in an idle state or in an inactive state, and residing in a satellite cell;

when the searched terrestrial cell meets the cell selection criterion, moving from the satellite cell to the searched terrestrial cell and completing the cell residing process.

Further, moving between the satellite cell and the terrestrial cell includes:

searching for a satellite cell by the terminal in an idle state or in an inactive state, and residing in a terrestrial cell;

when the searched satellite cell meets the cell selection criteria, moving from the terrestrial cell to the searched satellite cell and completing the cell residing process.

Wherein, the cell selection indication information is received through a connection rejection message, a connection release message or a paging short message.

Further, after the terminal in the idle state or the inactive state moves between the satellite cell and the terrestrial cell, the method further includes returning to the idle state.

In the specific embodiment of the present disclosure, when the terminal is in any cell selection state or resides in an acceptable cell and has the ability to receive satellite signals, the mobility rule of the terminal between the terrestrial cell and satellite cell are as follows:

(1) When the terminal is in a satellite cell or a terrestrial cell, and is in any cell selection state, it searches for the cell according to the following search priority:

Search for terrestrial cells based on stored information>Search for terrestrial cells based on scan search mode>Search for satellite cells based on stored information>Search for satellite cells based on scan search mode. If none of the above processes finds a suitable cell to reside on, then an acceptable cell in the terrestrial communication system is firstly selected for residing, and then the acceptable cell in the satellite system is secondly selected for residing.

Further, the above-mentioned terminal in an idle state or in an inactive state moving between a satellite cell and a terrestrial cellular cell, including:

A terminal in an idle state or an inactive state moving from a terrestrial cell to a satellite cell when a third preset condition is met;

Wherein, the third preset condition is: the terminal is in any cell selection state, and after the terminal has not found a terrestrial cell according to the stored information search mode and the scan search mode in turn, the terminal finds a satellite cell according to the stored information search mode;

Alternatively, the third preset condition is: the terminal is in any cell selection state, and the terminal has not found a terrestrial cell according to the stored information search mode and the scan search mode in turn, and after the terminal has not found a satellite cell according to the stored information search mode, the terminal finds a satellite cell according to the scan search mode;

Alternatively, the third preset condition is: the terminal is in any cell selection state, the terminal has not found a terrestrial cell according to the stored information search mode and the scan search mode in turn, and has not found a satellite cell according to the stored information search mode and the scan search mode, it is detected that there is no acceptable cell for residing in the terrestrial communication system, and there is an acceptable cell for residing in the satellite communication system.

Further, the above-mentioned terminal in an idle state or in an inactive state moving between a satellite cell and a terrestrial cellular cell, includes:

the terminal in the idle state or the inactive state moving from the satellite cell to the terrestrial cell when a fourth preset condition is met;

Wherein, the fourth preset condition is: the terminal is in any cell selection state, and finds the terrestrial cell according to the stored information search mode;

Alternatively, the fourth preset condition is: the terminal is in any cell selection state, and after the terminal has not found a terrestrial cell according to the stored information search mode, the terminal finds a terrestrial cell according to the scan search mode;

Alternatively, the fourth preset condition is: the terminal is in any cell selection state, the terminal has not found a terrestrial cell according to the stored information search mode and the scan search mode in turn, and has not found a satellite cell according to the stored information search mode and the scan search mode in turn, it is detected that there is an acceptable cell in the terrestrial communication system to reside on.

(2) When the terminal resides on an acceptable cell of the satellite cell, it searches for the cell according to the following search priority:

Search for satellite cells according to stored information>Search for satellite cells according to a general search mode. In this state, the terminal is not allowed to directly search for terrestrial cells; or Search for terrestrial cells based on stored information>Search for terrestrial cells based on scan search mode>Search for satellite cells based on stored information>Search for satellite cells based on scan search mode. If none of the above processes finds a suitable cell to reside on, then the acceptable cell in the terrestrial communication system is firstly selected for residing, and the acceptable cell in the satellite system is secondly selected for residing.

Further, the above-mentioned terminal in an idle state or in an inactive state moving between a satellite cell and a terrestrial cellular cell, includes:

the terminal in the idle state or in the inactive state moving from the satellite cell to the terrestrial cell when a fifth preset condition is met;

Wherein, the fifth preset condition is: the terminal resides on an acceptable cell in the satellite communication system, and the terminal finds a terrestrial cell according to the stored information search mode;

Alternatively, the fifth preset condition is: the terminal resides on an acceptable cell in the satellite communication system, and after the terminal has not found a terrestrial cell according to the stored information search mode, the terminal finds the terrestrial cell according to the scan search mode;

Alternatively, the fifth preset condition is: the terminal resides on an acceptable cell in the satellite communication system, the terminal has not found a terrestrial cell according to the stored information search mode and the scan search mode in turn, and has not found a satellite cell according to the stored information search mode and the scan search mode in turn, it is detected that there is an acceptable cell to reside on in the terrestrial communication system.

(3) When the terminal resides on an acceptable cell of the terrestrial communication system, it searches for the cell according to the following search priority:

Search for terrestrial cell based on stored information>Search for terrestrial cells based on scan search mode>Search for satellite cells based on stored information>Search for satellite cells based on scan search mode. If none of the above processes finds a suitable cell to reside on, then the acceptable cell in the terrestrial communication system is firstly selected for residing, and the acceptable cell in the satellite system is secondly selected for residing.

Further, the above-mentioned terminal in an idle state or in an inactive state moving between a satellite cell and a terrestrial cellular cell, includes:

the terminal in the idle state or in the inactive state moving from the terrestrial cell to the satellite cell when a sixth preset condition is met;

Wherein, the sixth preset condition is: the terminal resides on an acceptable cell in the terrestrial communication system, and the terminal finds a satellite cell according to the stored information search mode;

Alternatively, the sixth preset condition is: the terminal resides on an acceptable cell in the terrestrial communication system, and after the terminal has not found a satellite cell according to the stored information search mode, the terminal finds the satellite cell according to the scan search mode;

Alternatively, the sixth preset condition is: the terminal resides on an acceptable cell in the terrestrial communication system, the terminal has not found a terrestrial cell according to the stored information search mode and the scan search mode in turn, and has not found a satellite cell according to the stored information search mode and the scan search mode in turn, it is detected that there is an acceptable cell to reside on in the satellite communication system.

It should be noted that in the embodiments of the present disclosure, the primary task of a terminal in any cell selection state is to find a suitable cell and return to the normal residing state. If the terminal in this state cannot find a suitable cell within the time period defined by the state, the terminal needs to find an acceptable cell to reside on. If the terminal cannot find a suitable cell nor an acceptable cell to reside on, the terminal will remain in this state. The acceptable cell in the embodiment of the present disclosure means that the cell is not prohibited from residing and/or the cell meets the cell selection criterion.

Searching according to the stored information search mode in the embodiments of the present disclosure means that the terminal has stored some commonly used frequency point information, so that the terminal can reside on a cell faster without scanning all the frequency bands supported by the terminal to determine a cell. Searching according scan search mode search means that the terminal does not have any pre-stored common frequency point information, but only blindly scanning all frequency points supported by the terminal to determine which frequency point on which the cell is suitable for reside on. Obviously, scanning search mode is slower than scanning according to stored information.

The cell selection method of the present disclosure will be described below in conjunction with specific embodiments.

Embodiment 1: The network side uses a paging short message to explicitly instruct the terminal to search for a cell of the terrestrial frequency band or a cell of the satellite frequency band.

Figure 4:
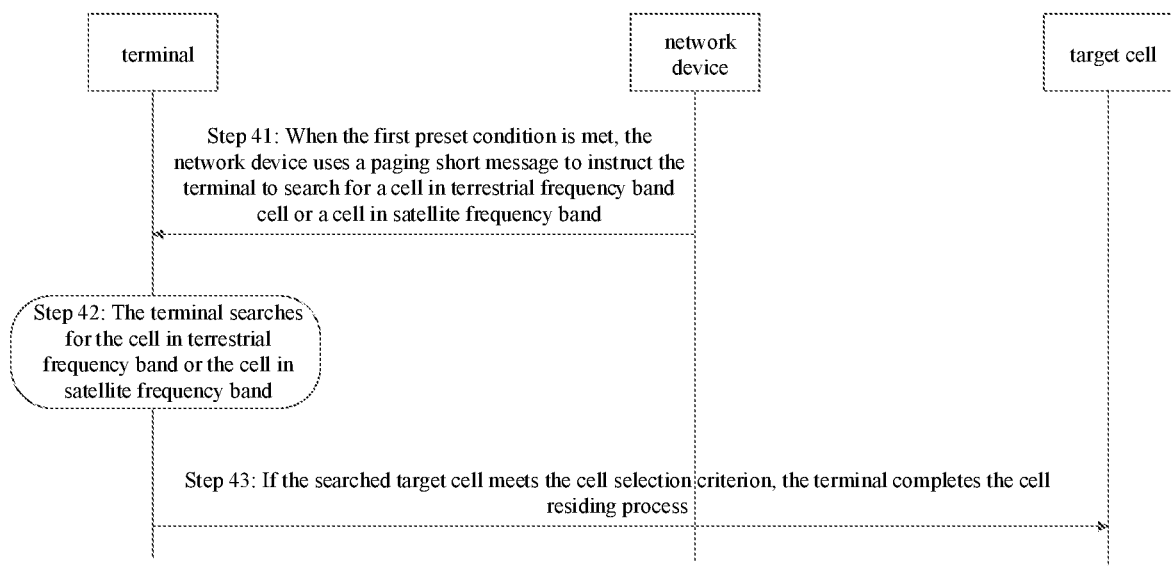
FIG. 4 is a schematic view showing interaction between the terminal and the network device according to one embodiment of the present disclosure.

The NR system defines an 8-bit paging short message in the physical downlink control channel. The 8-bit format in related art is shown in Table 2:

As shown in FIG. 4, it includes:

Step 41: When the first preset condition is met, the network device uses a paging short message to instruct the terminal to search for a cell in terrestrial frequency band cell or a cell in satellite frequency band;

Step 42: The terminal searches for the cell in terrestrial frequency band or the cell in satellite frequency band.

Step 43: If the searched target cell meets the cell selection criterion, the terminal completes the cell residing process.

Here, the above-mentioned target cell is the cell in terrestrial frequency band or the cell in satellite frequency band.

Embodiment 2: the network side uses a connection rejection message to instruct the terminal to search for a cell in terrestrial frequency band or a cell in satellite frequency band.

Figure 5:
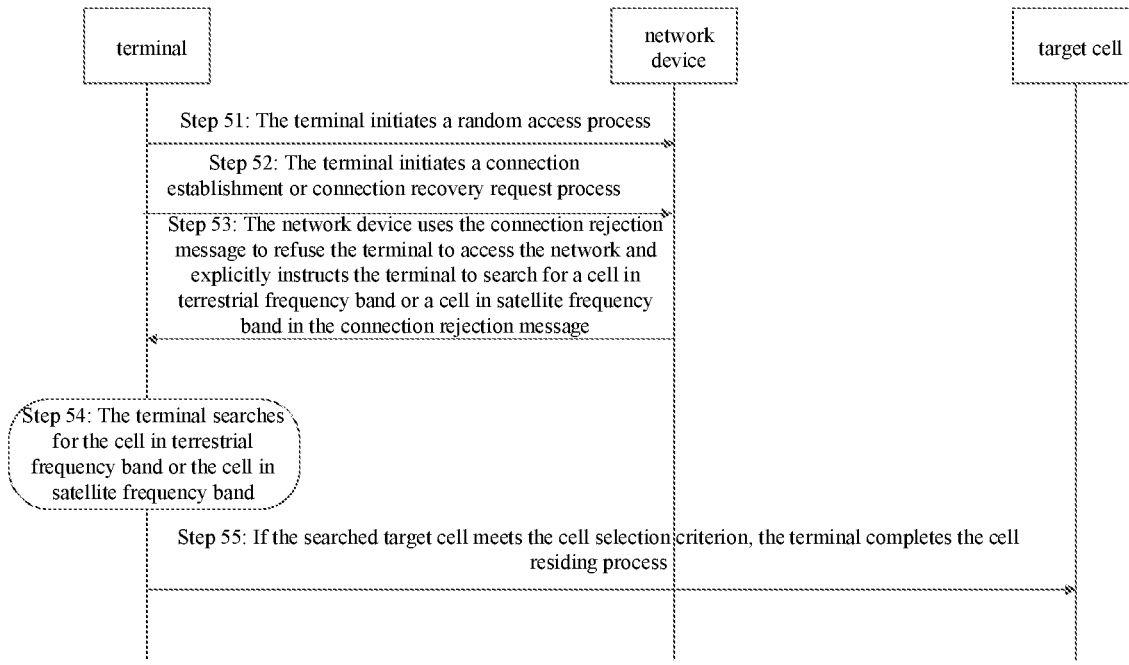
FIG. 5 is another schematic view showing interaction between the terminal and the network device according to one embodiment of the present disclosure.

As shown in FIG. 5, it includes:

Step 51: The terminal initiates a random access process.

Step 52: The terminal initiates a connection establishment or connection recovery request process.

Step 53: The network device uses the connection rejection message to refuse the terminal to access the network and explicitly instructs the terminal to search for a cell in terrestrial frequency band or a cell in satellite frequency band in the connection rejection message.

Step 54: The terminal searches for the cell in terrestrial frequency band or the cell in satellite frequency band.

Step 55: If the searched target cell meets the cell selection criterion, the terminal completes the cell residing process.

Here, the above-mentioned target cell is a cell in terrestrial frequency band or a cell in satellite frequency band.

Embodiment 3: The network side uses a connection release message to instruct the terminal to search for the cell in terrestrial frequency band or the cell in satellite frequency band.

Figure 6:
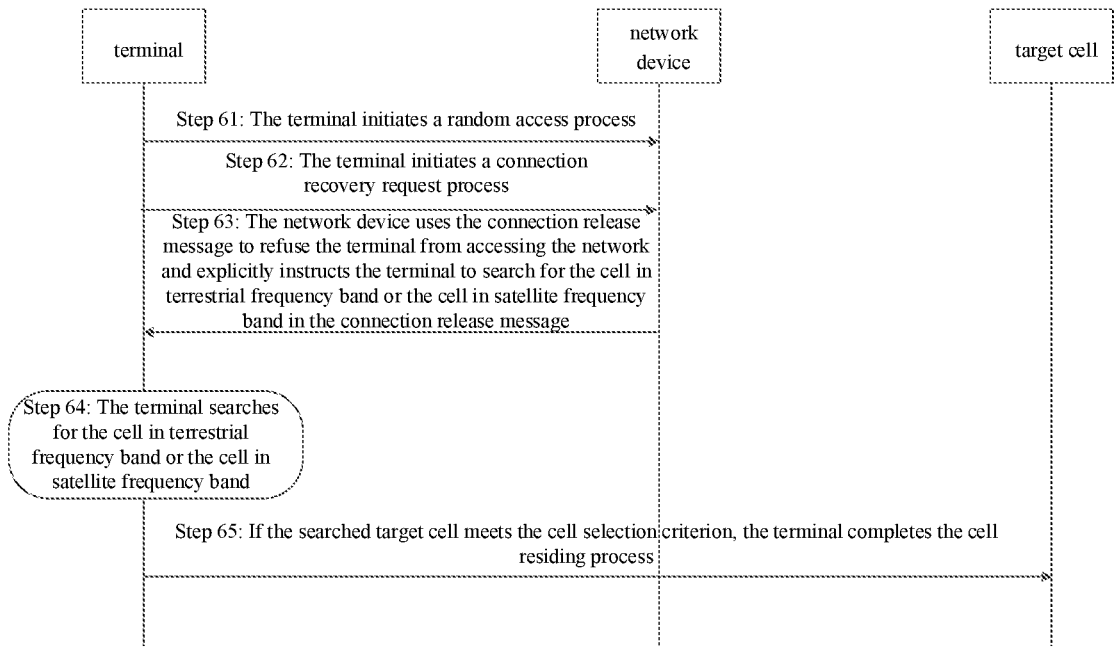
FIG. 6 is yet another schematic view showing interaction between the terminal and the network device according to one embodiment of the present disclosure.

As shown in FIG. 6, it includes:

Step 61: The terminal initiates a random access process.

Step 62: The terminal initiates a connection recovery request process.

Step 63: The network device uses the connection release message to refuse the terminal from accessing the network

TABLE 2

| First bit | Second bit | Third bit | Fourth bit | Fifth bit | Sixth bit | Seventh bit | Eighth bit |
|---|---|---|---|---|---|---|---|
| Indicating alarm information | Indicating system information update | reserved | reserved | reserved | reserved | reserved | reserved |

The format of the indication information after the terminal searches for a cell of the terrestrial frequency band or a cell of the satellite frequency band is added as shown in Table 3:

and explicitly instructs the terminal to search for the cell in terrestrial frequency band or the cell in satellite frequency band in the connection release message.

TABLE 3

| First bit | Second bit | Third bit | Fourth bit | Fifth bit | Sixth bit | Seventh bit | Eighth bit |
|---|---|---|---|---|---|---|---|
| Indicating alarm information | Indicating system information update | Indication information of terminal searching for a cell in a terrestrial frequency band or satellite frequency band | reserved | reserved | reserved | reserved | reserved |

Step 64: The terminal searches for the cell in terrestrial frequency band or the cell in satellite frequency band.

Step 65: If the searched target cell meets the cell selection criterion, the terminal completes the cell residing process.

Embodiment 4: The network side uses a connection release message to instruct the terminal to search for a cell in terrestrial frequency band or a cell in satellite frequency band.

Figure 7:
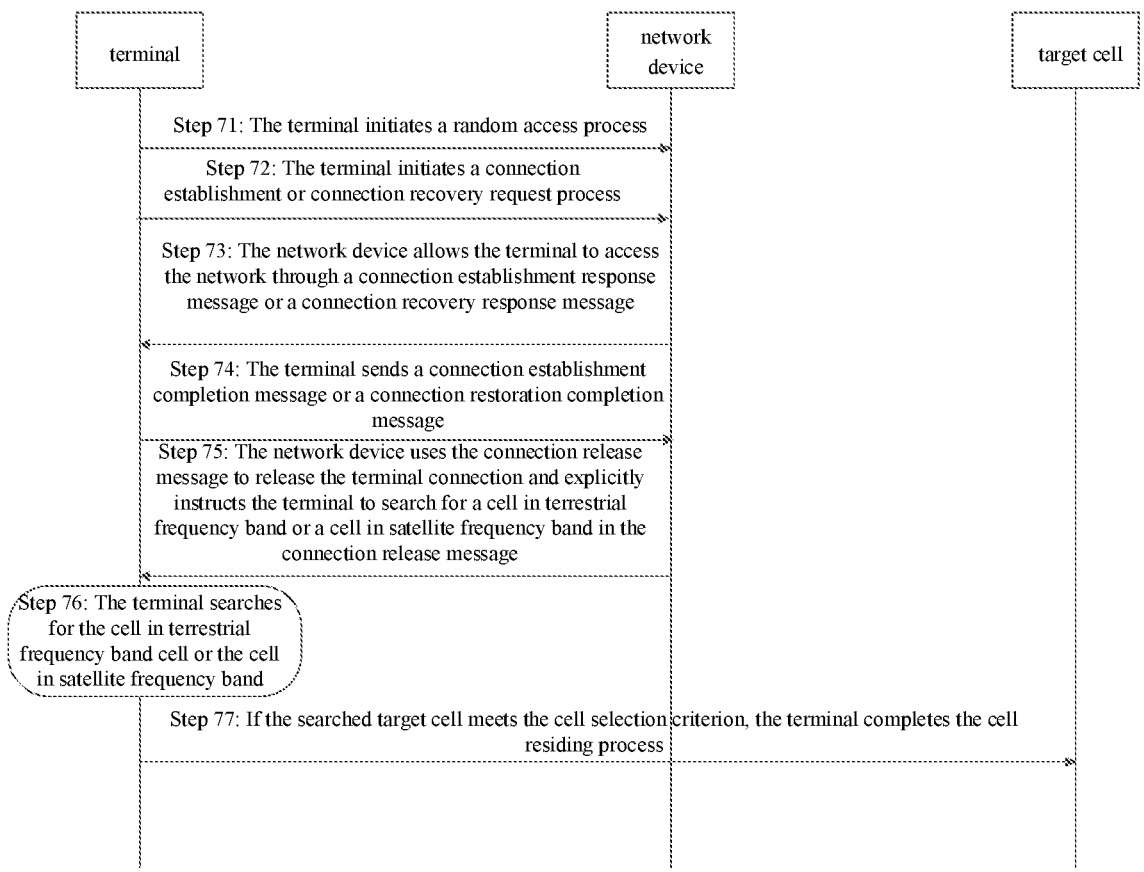
FIG. 7 is still yet another schematic view showing interaction between the terminal and the network device according to one embodiment of the present disclosure.

As shown in FIG. 7, it includes:

Step 71: The terminal initiates a random access process.

Step 72: The terminal initiates a connection establishment or connection recovery request process.

Step 73: The network device allows the terminal to access the network through a connection establishment response message or a connection recovery response message.

Step 74: The terminal sends a connection establishment completion message or a connection restoration completion message.

Step 75: The network device uses the connection release message to release the terminal connection and explicitly instructs the terminal to search for a cell in terrestrial frequency band or a cell in satellite frequency band in the connection release message.

Step 76: The terminal searches for the cell in terrestrial frequency band cell or the cell in satellite frequency band.

Step 77: If the searched target cell meets the cell selection criterion, the terminal completes the cell residing process.

Embodiment 5: The terminal side triggers by itself to search for a cell in the terrestrial frequency band or a cell in the satellite frequency band.

Figure 8:
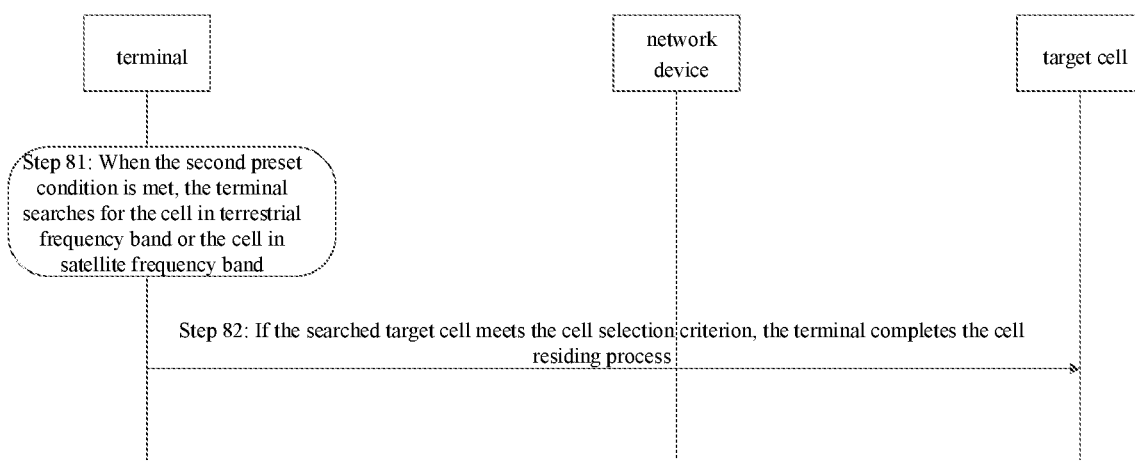
FIG. 8 is still yet another schematic view showing interaction between the terminal and the network device according to one embodiment of the present disclosure.

As shown in FIG. 8, it includes:

Step 81: When the second preset condition is met, the terminal searches for the cell in terrestrial frequency band or the cell in satellite frequency band.

Step 82: If the searched target cell meets the cell selection criterion, the terminal completes the cell residing process.

The target cell in the foregoing embodiment is the cell in terrestrial frequency band or the cell in satellite frequency band.

In the cell selection method of the embodiments of the present disclosure, when a preset condition is met, a terminal in an idle state or an inactive state moves between a satellite cell and a cellular cell, thereby solving the problem of mobility of the terminal between the satellite communication system and the terrestrial communication system.

Figure 9:
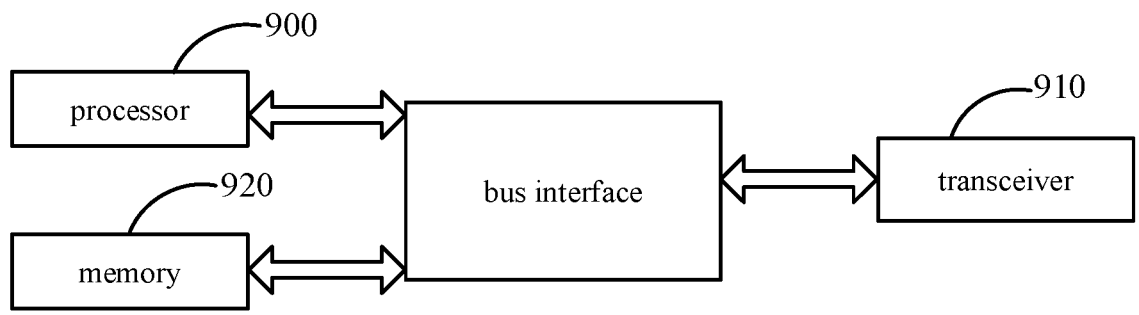
FIG. 9 is a block diagram showing a network device according to one embodiment of the present disclosure.

As shown in FIG. 9, the embodiment of the present disclosure also provides a network device. The network device may be specifically a base station, including a memory 920, a processor 900, a transceiver 910, a bus interface, and a program stored on the memory 920 and executed on the processor 900, where the processor 900 is used to read the program in the memory 920 and execute the following process:

triggering a terminal in an idle state or in an inactive state to move between a satellite cell and a terrestrial cell when the first preset condition is met.

Wherein, in FIG. 9, the bus architecture may include any number of interconnected buses and bridges. Specifically, various circuits of one or more processors represented by the processor 900 and the memory represented by the memory 920 are linked together. The bus architecture can also link various other circuits such as peripheral devices, voltage regulators, power management circuits, etc., which are all known in the art, and therefore, no further description will be given herein. The bus interface provides the interface. The transceiver 910 may be a plurality of elements, including a transmitter and a transceiver, and provide a unit for communicating with various other devices on a transmission medium. The processor 900 is responsible for managing the bus architecture and general processing, and the memory 920 can store data used by the processor 900 when performing operations.

Optionally, the first preset condition includes: the distance between the geographic coordinate corresponding to the center beam of the satellite and the at least one preset geographic coordinate is less than the first preset threshold.

Optionally, the step of the processor 900 executing a procedure for triggering a terminal in an idle state or an inactive state to move between a satellite cell and a terrestrial cell includes:

triggering the terminal in the idle state or inactive state and residing in the satellite cell to search for a terrestrial cell;

when the searched terrestrial cell meets a cell selection criterion, controlling the terminal to move from the satellite cell to the searched terrestrial cell and completing the cell residing process.

Optionally, the step of the processor 900 executing a procedure for triggering a terminal in an idle state or an inactive state to move between a satellite cell and a terrestrial cell includes:

triggering the terminal in an idle state or an inactive state and residing in a terrestrial cell to search for a satellite cell;

when the searched satellite cell meets the cell selection criterion, controlling the terminal to move from the terrestrial cell to the searched satellite cell and complete the cell residing process.

Optionally, the step of the processor 900 executing a procedure for triggering a terminal in an idle state or an inactive state to move between a satellite cell and a terrestrial cell includes:

triggering the terminal in the idle state or the inactive state to move between the satellite cell and the terrestrial cell by sending cell selection indication information to the terminal, the cell selection indication information is used to instruct the terminal to search for a cell in terrestrial frequency band or a cell in satellite frequency band.

Optionally, the cell selection indication information is sent to the terminal through a connection rejection message, a connection release message, or a paging short message.

The network device of the embodiment of the present disclosure triggers the terminal in the idle or inactive state to move between the satellite cell and the terrestrial cell when the first preset condition is met, thereby solving the problem of mobility of the terminal between the satellite communication system and the terrestrial communication system.

When the program is executed by the processor 900, all the implementation in the above-mentioned cell selection method applied to the network device side can be realized, and the same technical effect can be achieved. In order to avoid repetition, details are not repeated here.

In some embodiments of the present disclosure, a computer-readable storage medium is also provided, on which a computer program is stored, and when the program is executed by a processor, the following steps are implemented.

When the first preset condition is met, the terminal in the idle state or in the inactive state is triggered to move between the satellite cell and the terrestrial cell.

When the program is executed by the processor, all the implementation modes in the above-mentioned cell selection method embodiment applied to the network device side can be realized, and the same technical effect can be achieved. In order to avoid repetition, details are not described here.

Figure 10:
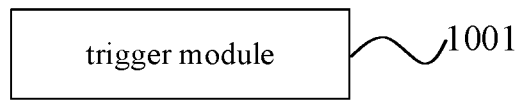
FIG. 10 is a schematic diagram showing modules of a network device according to one embodiment of the present disclosure.

As shown in FIG. 10, an embodiment of the present disclosure also provides a network device, including: a trigger module 1001, configured to trigger a terminal in an idle state or an inactive state to move between a satellite cell and a terrestrial cell when a first preset condition is met.

In the network device of the embodiment of the present disclosure, the first preset condition includes: the distance between the geographic coordinate corresponding to the center beam of the satellite and the at least one preset geographic coordinate is less than the first preset threshold.

In the network device of the embodiment of the present disclosure, the trigger module includes: a first triggering sub-module, configured to trigger the terminal in the idle state or inactive state and residing in the satellite cell to search for a terrestrial cell; a first control sub-module, configured to control the terminal to move from the satellite cell to the searched terrestrial cell and completing the cell residing process when the searched terrestrial cell meets a cell selection criterion.

In the network device of the embodiment of the present disclosure, the trigger module includes: a second triggering sub-module, configured to trigger the terminal in an idle state or an inactive state and residing in a terrestrial cell to search for a satellite cell; and a second control sub-module, configured to control the terminal to move from the terrestrial cell to the searched satellite cell and complete the cell residing process when the searched satellite cell meets the cell selection criterion.

In the network device of the embodiment of the present disclosure, the trigger module is used to trigger the terminal in an idle or inactive state to move between a satellite cell and a terrestrial cell by sending cell selection indication information to the terminal, the cell selection indication information is used to instruct the terminal to search for a cell in the terrestrial frequency band or a cell in the satellite frequency band.

In the network device of the embodiment of the present disclosure, the cell selection indication information is sent to the terminal through a connection rejection message, a connection release message, or a paging short message.

The network device of the embodiment of the present disclosure triggers the terminal in the idle or inactive state to move between the satellite cell and the terrestrial cell when the first preset condition is met, thereby solving the problem of mobility of the terminal between the satellite communication system and the terrestrial communication system.

The network device of the embodiment of the present disclosure can implement all the implementation in the above-mentioned cell selection method applied to the network device, and can achieve the same technical effect. In order to avoid repetition, details are not described herein again.

Figure 11:
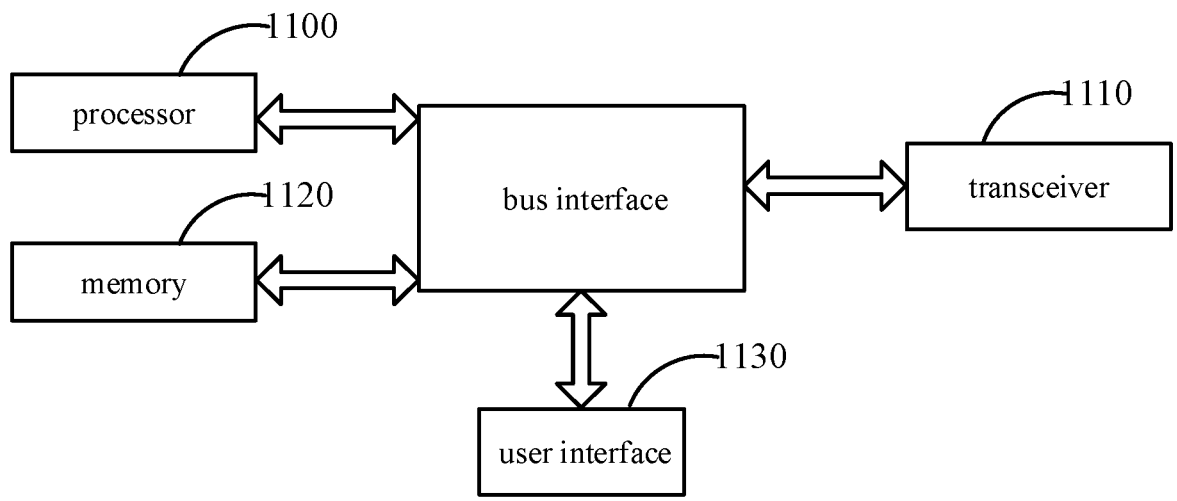
FIG. 11 is a block diagram showing a terminal according to one embodiment of the present disclosure.

As shown in FIG. 11, an embodiment of the present disclosure also provides a terminal, including: a transceiver, a memory, a processor, and a program stored in the memory and executed on the processor, and the processor executes the computer program to implement the following steps: the terminal in the idle state or in the inactive state moving between the satellite cell and the terrestrial cell when a second preset condition is met.

Wherein, in FIG. 11, the bus architecture may include any number of interconnected buses and bridges. Specifically, various circuits of one or more processors represented by the processor 1100 and the memory represented by the memory 1120 are linked together. The bus architecture can also link various other circuits such as peripheral devices, voltage regulators, power management circuits, etc., which are all known in the art, and therefore, no further description will be given herein. The bus interface provides the interface. The transceiver 1110 may be a plurality of elements, including a transmitter and a transceiver, and provide a unit for communicating with various other devices on a transmission medium. For different user equipment, the user interface 1130 may also be an interface capable of connecting externally and internally with the required device. The connected device includes but not limited to a keypad, a display, a speaker, a microphone, a joystick, and the like.

The processor 1100 is responsible for managing the bus architecture and general processing, and the memory 1120 may store data used by the processor 1100 when performing operations.

Optionally, the steps for the processor 1100 to execute the program of moving between a satellite cell and a terrestrial cell include:

searching for the terrestrial cell by a terminal in an idle state or in an inactive state and residing in a satellite cell;

when the searched terrestrial cell meets the cell selection criterion, moving from the satellite cell to the searched terrestrial cell and completing the cell residing process.

Optionally, the steps in which the processor 1100 executes the program of moving between a satellite cell and a terrestrial cell include:

Searching for a satellite cell by a terminal in an idle state or in an inactive state, and residing in a terrestrial cell;

when the searched satellite cell meets the cell selection criteria, moving from the terrestrial cell to the searched satellite cell and completing the cell residing process.

Optionally, the second preset condition includes at least one of the following:

a distance between the current geographic location coordinates of the terminal and the at least one preset geographic coordinate is less than a second preset di stance threshold;

receiving cell selection indication information sent by a network device, where the cell selection indication information is used to instruct the terminal to search for a cell in terrestrial frequency band cell or a cell in satellite frequency band;

the terminal cannot find a satellite frequency band signal or a terrestrial frequency band signal.

Optionally, the cell selection indication information is received through a connection rejection message, a connection release message, or a paging short message.

After the processor 1100 executes that the terminal in the idle state or the inactive state moves between the satellite cell and the terrestrial cell, it is also used to execute: returning to the idle state.

Optionally, the steps for the processor 1100 to execute a procedure for a terminal in an idle state or an inactive state to move between a satellite cell and a terrestrial cell include:

A terminal in an idle state or an inactive state moving from a terrestrial cell to a satellite cell when a third preset condition is met;

Wherein, the third preset condition is: the terminal is in any cell selection state, and after the terminal has not found a terrestrial cell according to the stored information search mode and the scan search mode in turn, the terminal finds a satellite cell according to the stored information search mode;

Alternatively, the third preset condition is: the terminal is in any cell selection state, and the terminal has not found a terrestrial cell according to the stored information search mode and the scan search mode in turn, and after the terminal has not found a satellite cell according to the stored information search mode, the terminal finds a satellite cell according to the scan search mode;

Alternatively, the third preset condition is: the terminal is in any cell selection state, the terminal has not found a terrestrial cell according to the stored information search mode and the scan search mode in turn, and has not found a satellite cell according to the stored information search mode and the scan search mode, it is detected that there is no acceptable cell for residing in the terrestrial communication system, and there is an acceptable cell for residing in the satellite communication system.

Optionally, the steps for the processor 1100 to execute a procedure for a terminal in an idle state or an inactive state to move between a satellite cell and a terrestrial cell include:

the terminal in the idle state or the inactive state moving from the satellite cell to the terrestrial cell when a fourth preset condition is met;

Wherein, the fourth preset condition is: the terminal is in any cell selection state, and finds the terrestrial cell according to the stored information search mode;

Alternatively, the fourth preset condition is: the terminal is in any cell selection state, and after the terminal has not found a terrestrial cell according to the stored information search mode, the terminal finds a terrestrial cell according to the scan search mode;

Alternatively, the fourth preset condition is: the terminal is in any cell selection state, the terminal has not found a terrestrial cell according to the stored information search mode and the scan search mode in turn, and has not found a satellite cell according to the stored information search mode and the scan search mode in turn, it is detected that there is an acceptable cell in the terrestrial communication system to reside on.

Optionally, the steps for the processor 1100 to execute a procedure for a terminal in an idle state or an inactive state to move between a satellite cell and a terrestrial cell include:

the terminal in the idle state or in the inactive state moving from the satellite cell to the terrestrial cell when a fifth preset condition is met;

Wherein, the fifth preset condition is: the terminal resides on an acceptable cell in the satellite communication system, and the terminal finds a terrestrial cell according to the stored information search mode;

Alternatively, the fifth preset condition is: the terminal resides on an acceptable cell in the satellite communication system, and after the terminal has not found a terrestrial cell according to the stored information search mode, the terminal finds the terrestrial cell according to the scan search mode;

Alternatively, the fifth preset condition is: the terminal resides on an acceptable cell in the satellite communication system, the terminal has not found a terrestrial cell according to the stored information search mode and the scan search mode in turn, and has not found a satellite cell according to the stored information search mode and the scan search mode in turn, it is detected that there is an acceptable cell to reside on in the terrestrial communication system.

Optionally, the steps for the processor 1100 to execute a procedure for a terminal in an idle state or an inactive state to move between a satellite cell and a terrestrial cell include:

the terminal in the idle state or in the inactive state moving from the terrestrial cell to the satellite cell when a sixth preset condition is met;

Wherein, the sixth preset condition is: the terminal resides on an acceptable cell in the terrestrial communication system, and the terminal finds a satellite cell according to the stored information search mode;

Alternatively, the sixth preset condition is: the terminal resides on an acceptable cell in the terrestrial communication system, and after the terminal has not found a satellite cell according to the stored information search mode, the terminal finds the satellite cell according to the scan search mode;

Alternatively, the sixth preset condition is: the terminal resides on an acceptable cell in the terrestrial communication system, the terminal has not found a terrestrial cell according to the stored information search mode and the scan search mode in turn, and has not found a satellite cell according to the stored information search mode and the scan search mode in turn, it is detected that there is an acceptable cell to reside on in the satellite communication system.

When the program is executed by the processor 1100, all the implementation in the above-mentioned cell selection method applied to the terminal can be realized, and the same technical effect can be achieved. In order to avoid repetition, details are not described herein again.

In some embodiments of the present disclosure, a computer-readable storage medium is also provided, on which a computer program is stored, and when the program is executed by a processor, the following steps are implemented.

When the second preset condition is met, the terminal in the idle state or in the inactive state moves between the satellite cell and the terrestrial cell.

When the program is executed by the processor, all the implementation in the above-mentioned cell selection method applied to the terminal can be realized, and the same technical effect can be achieved. To avoid repetition, details are not described here.

Figure 12:
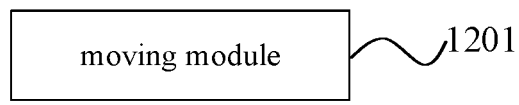
FIG. 12 is a schematic diagram showing modules of a terminal according to one embodiment of the present disclosure.

As shown in FIG. 12, an embodiment of the present disclosure also provides a terminal, including: a moving module 1201, configured to enable a terminal in an idle state or an inactive state to move between the satellite cell and the terrestrial cell when the second preset condition is met.

In the terminal of the embodiment of the present disclosure, the moving module includes:
- a first searching sub-module, configured to make the terminal that is in an idle state or in an inactive state and resides in a satellite cell to search for a terrestrial cell;
- a first moving sub-module, configured to enable the terminal to move from the satellite cell to the searched terrestrial cell and complete the cell residing process when the searched terrestrial cell meets the cell selection criterion.

In the terminal of the embodiment of the present disclosure, the moving module includes:
- a second searching sub-module, configured to enable the terminal in the idle state or in the inactive state and residing on the terrestrial cell to search for the satellite cell;
- a second moving sub-module, configured to enable the terminal to move from the terrestrial cell to the searched satellite cell and complete the cell residing process when the searched satellite cell meets the cell selection criterion.

In the terminal of the embodiment of the present disclosure, the second preset condition includes at least one of the following:
- a distance between the current geographic location coordinates of the terminal and the at least one preset geographic coordinate is less than a second preset distance threshold;
- receiving cell selection indication information sent by a network device, where the cell selection indication information is used to instruct the terminal to search for a cell in terrestrial frequency band cell or a cell in satellite frequency band;
- the terminal cannot find a satellite frequency band signal or a terrestrial frequency band signal.

In the terminal of the embodiment of the present disclosure, the cell selection indication information is received through a connection rejection message, a connection release message, or a paging short message.

The terminal of the embodiment of the present disclosure further includes:
- a processing module, configured to control the terminal to return to the idle state after the moving module moves the terminal in the idle state or in the inactive state between the satellite cell and the terrestrial cell.

In the terminal of the embodiment of the present disclosure, the moving module is configured to move the terminal from a terrestrial cell to a satellite cell when the terminal in an idle state or in an inactive state meets the third preset condition;

Wherein, the third preset condition is: the terminal is in any cell selection state, and after the terminal has not found a terrestrial cell according to the stored information search mode and the scan search mode in turn, the terminal finds a satellite cell according to the stored information search mode;

Alternatively, the third preset condition is: the terminal is in any cell selection state, and the terminal has not found a terrestrial cell according to the stored information search mode and the scan search mode in turn, and after the terminal has not found a satellite cell according to the stored information search mode, the terminal finds a satellite cell according to the scan search mode;

Alternatively, the third preset condition is: the terminal is in any cell selection state, the terminal has not found a terrestrial cell according to the stored information search mode and the scan search mode in turn, and has not found a satellite cell according to the stored information search mode and the scan search mode, it is detected that there is no acceptable cell for residing in the terrestrial communication system, and there is an acceptable cell for residing in the satellite communication system.

In the terminal of the embodiment of the present disclosure, the moving module is configured to move the terminal from the satellite cell to the terrestrial cell when the terminal in the idle state or the inactive state meets the fourth preset condition;

Wherein, the fourth preset condition is: the terminal is in any cell selection state, and finds the terrestrial cell according to the stored information search mode;

Alternatively, the fourth preset condition is: the terminal is in any cell selection state, and after the terminal has not found a terrestrial cell according to the stored information search mode, the terminal finds a terrestrial cell according to the scan search mode;

Alternatively, the fourth preset condition is: the terminal is in any cell selection state, the terminal has not found a terrestrial cell according to the stored information search mode and the scan search mode in turn, and has not found a satellite cell according to the stored information search mode and the scan search mode in turn, it is detected that there is an acceptable cell in the terrestrial communication system to reside on.

In the terminal of the embodiment of the present disclosure, the moving module is configured to move the terminal from the satellite cell to the terrestrial cell when the terminal in the idle state or the inactive state meets the fifth preset condition;

Wherein, the fifth preset condition is: the terminal resides on an acceptable cell in the satellite communication system, and the terminal finds a terrestrial cell according to the stored information search mode;

Alternatively, the fifth preset condition is: the terminal resides on an acceptable cell in the satellite communication system, and after the terminal has not found a terrestrial cell according to the stored information search mode, the terminal finds the terrestrial cell according to the scan search mode;

Alternatively, the fifth preset condition is: the terminal resides on an acceptable cell in the satellite communication system, the terminal has not found a terrestrial cell according to the stored information search mode and the scan search mode in turn, and has not found a satellite cell according to the stored information search mode and the scan search mode in turn, it is detected that there is an acceptable cell to reside on in the terrestrial communication system.

In the terminal of the embodiment of the present disclosure, the moving module is configured to move the terminal from the terrestrial cell to the satellite cell when the terminal in an idle state or in an inactive state meets the sixth preset condition;

Wherein, the sixth preset condition is: the terminal resides on an acceptable cell in the terrestrial communication system, and the terminal finds a satellite cell according to the stored information search mode;

Alternatively, the sixth preset condition is: the terminal resides on an acceptable cell in the terrestrial communication system, and after the terminal has not found a satellite cell according to the stored information search mode, the terminal finds the satellite cell according to the scan search mode;

Alternatively, the sixth preset condition is: the terminal resides on an acceptable cell in the terrestrial communication system, the terminal has not found a terrestrial cell according to the stored information search mode and the scan search mode in turn, and has not found a satellite cell according to the stored information search mode and the scan search mode in turn, it is detected that there is an acceptable cell to reside on in the satellite communication system.

In the terminal of the embodiment of the present disclosure, when the second preset condition is met, the terminal in the idle state or in the inactive state moves between the satellite cell and the terrestrial cell, thereby solving the problem of mobility of the terminal between the satellite communication system and the terrestrial communication system.

The terminal of the embodiment of the present disclosure can implement all the implementation in the above-mentioned cell selection method applied to the terminal, and can achieve the same technical effect. In order to avoid repetition, details are not described herein again.

In the various embodiments of the present disclosure, it should be understood that the value of the sequence numbers of the foregoing processes does not mean the order of execution, and the execution order of each process should be determined by its function and internal logic, and should not limit the implementation process of the embodiments of the present disclosure.

A person of ordinary skill in the art may be aware that the units and algorithm steps of the examples described in the embodiments of the present disclosure can be implemented by electronic hardware or a combination of computer software and electronic hardware. Whether these functions are executed by hardware or software depends on the specific application and design constraint conditions of the technical solution. The person of ordinary skill in the art can use different methods for each specific application to implement the described functions, but such implementation should not be considered as going beyond the scope of the present disclosure.

Those skilled in the art can clearly understand that, for the convenience and conciseness of description, the specific working process of the system, device and unit described above can refer to the corresponding process in the foregoing method embodiment, which will not be repeated here.

In the embodiments provided in the present disclosure, it should be understood that the disclosed device and method may be implemented in other ways. For example, the device embodiments described above are only illustrative. For example, the division of the units is only a logical function division, and there may be other divisions in actual implementation, for example, multiple units or components may be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related technology can be embodied in the form of a software product. The computer software product is stored in a storage medium and includes several instructions to make a computer device (which may be a personal computer, a server, or a network device, etc.) executes all or part of the steps of the methods described in the various embodiments of the present disclosure. The aforementioned storage media include: U disk, mobile hard disk, ROM, RAM, magnetic disk or optical disk and other media that can store program codes.

A person of ordinary skill in the art can understand that all or part of the processes in the above-mentioned embodiment methods can be implemented by controlling the relevant hardware through a computer program. The program can be stored in a computer readable storage medium. When executed, it may include the procedures of the above-mentioned method embodiments. Wherein, the storage medium may be a magnetic disk, an optical disc, a read-only memory (ROM), or a random access memory (RAM), etc.

It can be understood that the embodiments described in the embodiments of the present disclosure can be implemented by hardware, software, firmware, middleware, microcode, or a combination thereof. For hardware implementation, modules, units, and sub-units can be implemented in one or more Application Specific Integrated Circuits (ASIC), Digital Signal Processor (DSP), and Digital Signal Processing Device (DSP Device, DSPD), Programmable Logic Device (PLD), Field-Programmable Gate Array (FPGA), general-purpose processors, controllers, microcontrollers, microprocessors, used to implement other electronic units or other combination of the function described in the present disclosure.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for those of ordinary skill in the art, several improvements and modifications can be made without departing from the principles of the present disclosure. These improvements and modifications should also be regarded as the protection scope of the present disclosure.

What is claimed is:

1. A cell selection method applied to a terminal, comprising:
    moving between a satellite cell and a terrestrial cell by the terminal in an idle state or in an inactive state when a second preset condition is met;
    wherein the second preset condition includes at least one of the following:
    a distance between a current geographic location coordinate of the terminal and at least one preset geographic coordinate is less than a second preset distance threshold;
    receiving cell selection indication information sent by a network device, wherein the cell selection indication information is used to instruct the terminal to search for a cell in a terrestrial frequency band or a cell in a satellite frequency band; or
    the terminal does not find a satellite frequency band signal or a terrestrial frequency band signal,
    wherein the cell selection indication information is received through a connection rejection message, a connection release message, or a paging short message.

2. The cell selection method according to claim 1, wherein the moving between a satellite cell and a terrestrial cell comprises:
    searching for the terrestrial cell by the terminal in the idle state or in the inactive state and residing in the satellite cell;
    moving from the satellite cell to the searched terrestrial cell and completing a cell residing process when the searched terrestrial cell meets a cell selection criterion.

3. The cell selection method according to claim 1, wherein the moving between a satellite cell and a terrestrial cell comprises:
    searching for the satellite cell by the terminal in the idle state or in the inactive state and residing in the terrestrial cell;

moving from the terrestrial cell to the searched satellite cell and completing a cell residing process when the searched satellite cell meets a cell selection criteria.

4. The cell selection method according to claim 1, wherein after moving between a satellite cell and a terrestrial cell by the terminal in an idle state or in an inactive state, the method further comprises:
returning to the idle state.

5. The cell selection method according to claim 1, wherein the moving between a satellite cell and a terrestrial cell by the terminal in an idle state or in an inactive state comprises:
moving from the terrestrial cell to the satellite cell by the terminal in the idle state or the inactive state when a third preset condition is met;
wherein, the third preset condition is: the terminal is in any cell selection state, and after the terminal has not found the terrestrial cell according to a stored information search mode and a scan search mode in turn, the terminal finds the satellite cell according to the stored information search mode; or
the third preset condition is: the terminal is in any cell selection state, and the terminal has not found the terrestrial cell according to the stored information search mode and the scan search mode in turn, and after the terminal has not found the satellite cell according to the stored information search mode, the terminal finds the satellite cell according to the scan search mode; or
the third preset condition is: the terminal is in any cell selection state, the terminal has not found the terrestrial cell according to the stored information search mode and the scan search mode in turn, and has not found the satellite cell according to the stored information search mode and the scan search mode, it is detected that there is no acceptable cell for residing in a terrestrial communication system, and there is an acceptable cell for residing in a satellite communication system.

6. The cell selection method according to claim 1, wherein the moving between a satellite cell and a terrestrial cell by the terminal in an idle state or in an inactive state comprises:
moving from the satellite cell to the terrestrial cell by the terminal in the idle state or the inactive state when a fourth preset condition is met;
wherein, the fourth preset condition is: the terminal is in any cell selection state, and finds the terrestrial cell according to a stored information search mode; or
the fourth preset condition is: the terminal is in any cell selection state, and after the terminal has not found the terrestrial cell according to the stored information search mode, the terminal finds the terrestrial cell according to a scan search mode; or
the fourth preset condition is: the terminal is in any cell selection state, the terminal has not found the terrestrial cell according to the stored information search mode and the scan search mode in turn, and has not found the satellite cell according to the stored information search mode and the scan search mode in turn, it is detected that there is an acceptable cell for residing in a terrestrial communication system.

7. The cell selection method according to claim 1, wherein the moving between a satellite cell and a terrestrial cell by the terminal in an idle state or in an inactive state comprises:
moving from the satellite cell to the terrestrial cell by the terminal in the idle state or in the inactive state when a fifth preset condition is met;
wherein, the fifth preset condition is: the terminal resides on an acceptable cell in a satellite communication system, and the terminal finds the terrestrial cell according to a stored information search mode; or
the fifth preset condition is: the terminal resides on the acceptable cell in the satellite communication system, and after the terminal has not found the terrestrial cell according to the stored information search mode, the terminal finds the terrestrial cell according a the scan search mode; or
the fifth preset condition is: the terminal resides on the acceptable cell in the satellite communication system, the terminal has not found the terrestrial cell according to the stored information search mode and the scan search mode in turn, and has not found the satellite cell according to the stored information search mode and the scan search mode in turn, it is detected that there is an acceptable cell to reside on in a terrestrial communication system.

8. The cell selection method according to claim 1, wherein the moving between a satellite cell and a terrestrial cell by the terminal in an idle state or in an inactive state comprises:
moving from the terrestrial cell to the satellite cell by the terminal in the idle state or in the inactive state when a sixth preset condition is met;
wherein, the sixth preset condition is: the terminal resides on an acceptable cell in a terrestrial communication system, and the terminal finds the satellite cell according to a stored information search mode; or
the sixth preset condition is: the terminal resides on the acceptable cell in the terrestrial communication system, and after the terminal has not found the satellite cell according to the stored information search mode, the terminal finds the satellite cell according to a scan search mode; or
the sixth preset condition is: the terminal resides on the acceptable cell in the terrestrial communication system, the terminal has not found the terrestrial cell according to the stored information search mode and the scan search mode in turn, and has not found the satellite cell according to the stored information search mode and the scan search mode in turn, it is detected that there is an acceptable cell to reside on in a satellite communication system.

9. A terminal comprising a transceiver, a memory, a processor and a program stored on the memory and executed by the processor, the process executes the program to implement the step of:
moving between a satellite cell and a terrestrial cell by the terminal in an idle state or in an inactive state when a second preset condition is met;
wherein the second preset condition includes at least one of the following:
a distance between a current geographic location coordinate of the terminal and at least one preset geographic coordinate is less than a second preset distance threshold;
receiving cell selection indication information sent by a network device, wherein the cell selection indication information is used to instruct the terminal to search for a cell in a terrestrial frequency band or a cell in a satellite frequency band; or
the terminal does not find a satellite frequency band signal or a terrestrial frequency band signal,
wherein the cell selection indication information is received through a connection rejection message, a connection release message, or a paging short message.

10. The terminal according to claim 9, wherein the processor implements the step of moving between a satellite cell and a terrestrial cell comprises:
    searching for the terrestrial cell by the terminal in the idle state or in the inactive state and residing in the satellite cell;
    moving from the satellite cell to the searched terrestrial cell and completing a cell residing process when the searched terrestrial cell meets a cell selection criterion.

11. The terminal according to claim 9, wherein the processor implements the step of moving between a satellite cell and a terrestrial cell comprises:
    searching for the satellite cell by the terminal in the idle state or in the inactive state and residing in the terrestrial cell;
    moving from the terrestrial cell to the searched satellite cell and completing a cell residing process when the searched satellite cell meets a cell selection criteria.

12. The terminal according to claim 9, wherein after the processor implements the step of moving between a satellite cell and a terrestrial cell by the terminal in an idle state or in an inactive state, the processor further implements the step of:
    returning to the idle state.

13. The terminal according to claim 9, wherein the processor implements the step of the moving between a satellite cell and a terrestrial cell by the terminal in an idle state or in an inactive state comprises:
    moving from the terrestrial cell to the satellite cell by the terminal in the idle state or the inactive state when a third preset condition is met;
    wherein, the third preset condition is: the terminal is in any cell selection state, and after the terminal has not found the terrestrial cell according to a stored information search mode and a scan search mode in turn, the terminal finds the satellite cell according to the stored information search mode; or
    the third preset condition is: the terminal is in any cell selection state, and the terminal has not found the terrestrial cell according to the stored information search mode and the scan search mode in turn, and after the terminal has not found the satellite cell according to the stored information search mode, the terminal finds the satellite cell according to the scan search mode; or
    the third preset condition is: the terminal is in any cell selection state, the terminal has not found the terrestrial cell according to the stored information search mode and the scan search mode in turn, and has not found the satellite cell according to the stored information search mode and the scan search mode, it is detected that there is no acceptable cell for residing in a terrestrial communication system, and there is an acceptable cell for residing in a satellite communication system.

14. The terminal according to claim 9, wherein the processor implements the step of moving between a satellite cell and a terrestrial cell by the terminal in an idle state or in an inactive state comprises:
    moving from the satellite cell to the terrestrial cell by the terminal in the idle state or the inactive state when a fourth preset condition is met;
    wherein, the fourth preset condition is: the terminal is in any cell selection state, and finds the terrestrial cell according to a stored information search mode; or
    the fourth preset condition is: the terminal is in any cell selection state, and after the terminal has not found the terrestrial cell according to the stored information search mode, the terminal finds the terrestrial cell according to a scan search mode; or
    the fourth preset condition is: the terminal is in any cell selection state, the terminal has not found the terrestrial cell according to the stored information search mode and the scan search mode in turn, and has not found the satellite cell according to the stored information search mode and the scan search mode in turn, it is detected that there is an acceptable cell for residing in a terrestrial communication system.

15. The terminal according to claim 9, wherein the processor implements the step of the moving between a satellite cell and a terrestrial cell by the terminal in an idle state or in an inactive state comprises:
    moving from the satellite cell to the terrestrial cell by the terminal in the idle state or in the inactive state when a fifth preset condition is met;
    wherein, the fifth preset condition is: the terminal resides on an acceptable cell in a satellite communication system, and the terminal finds the terrestrial cell according to a stored information search mode; or
    the fifth preset condition is: the terminal resides on the acceptable cell in the satellite communication system, and after the terminal has not found the terrestrial cell according to the stored information search mode, the terminal finds the terrestrial cell according to the scan search mode; or
    the fifth preset condition is: the terminal resides on the acceptable cell in the satellite communication system, the terminal has not found the terrestrial cell according to the stored information search mode and the scan search mode in turn, and has not found the satellite cell according to the stored information search mode and the scan search mode in turn, it is detected that there is an acceptable cell to reside on in a terrestrial communication system.

16. The terminal according to claim 9, wherein the processor implements the step of the moving between a satellite cell and a terrestrial cell by the terminal in an idle state or in an inactive state comprises:
    moving from the terrestrial cell to the satellite cell by the terminal in the idle state or in the inactive state when a sixth preset condition is met;
    wherein, the sixth preset condition is: the terminal resides on an acceptable cell in a terrestrial communication system, and the terminal finds the satellite cell according to a stored information search mode; or
    the sixth preset condition is: the terminal resides on the acceptable cell in the terrestrial communication system, and after the terminal has not found the satellite cell according to the stored information search mode, the terminal finds the satellite cell according to a scan search mode; or
    the sixth preset condition is: the terminal resides on the acceptable cell in the terrestrial communication system, the terminal has not found the terrestrial cell according to the stored information search mode and the scan search mode in turn, and has not found the satellite cell according to the stored information search mode and the scan search mode in turn, it is detected that there is an acceptable cell to reside on in a satellite communication system.

17. A cell selection method applied to a network device, comprising:
    triggering a terminal in an idle state or in an inactive state to move between a satellite cell and a terrestrial cell when a first preset condition is met, wherein the first preset condition includes: a distance between a geographic coordinate corresponding to a center beam of a satellite and at least one preset geographic coordinate is less than the first preset threshold.

18. A network device, comprising: a transceiver, a memory, a processor and a program stored on the memory and executed by the processor, the processor executes the program to implement the cell selection method according to claim 17.

* * * * *